United States Patent [19]

Roba

[11] Patent Number: 4,702,759
[45] Date of Patent: Oct. 27, 1987

[54] APPARATUS FOR REDUCING VOLUME AND SURFACE DEFECTS IN SILICA OPTICAL-FIBRES

[75] Inventor: Giacomo Roba, Cogoleto, Italy

[73] Assignee: Cselt-Centro Studi e Laboratori Telecomunicacioni S.p.A., Turin, Italy

[21] Appl. No.: 930,804

[22] Filed: Nov. 13, 1986

Related U.S. Application Data

[62] Division of Ser. No. 817,025, Jan. 8, 1986, Pat. No. 4,659,354.

[30] Foreign Application Priority Data

Mar. 18, 1985 [IT] Italy .................... 67265 A/85

[51] Int. Cl.[4] .............. C03B 37/023; C03C 25/02
[52] U.S. Cl. .................... 65/13; 65/3.11; 65/3.12; 65/32
[58] Field of Search .............. 65/1, 2, 3.4, 3.12, 65/13, 60.6, 60.8, 32

[56] References Cited

U.S. PATENT DOCUMENTS

| | | | |
|---|---|---|---|
| 4,400,190 | 8/1983 | Briere | 65/13 |
| 4,437,870 | 3/1984 | Miller | 65/13 X |
| 4,440,556 | 4/1984 | Oh et al. | 65/2 |
| 4,514,205 | 4/1985 | Darcangelo et al. | 65/13 X |
| 4,578,098 | 3/1986 | Paek et al. | 65/13 |
| 4,613,521 | 9/1986 | Smith | 65/13 X |

FOREIGN PATENT DOCUMENTS

| | | | |
|---|---|---|---|
| 3340640 | 5/1985 | Fed. Rep. of Germany | 65/3.12 |
| 59-162149 | 9/1984 | Japan | 65/60.8 |

*Primary Examiner*—Robert L. Lindsay
*Attorney, Agent, or Firm*—Karl F. Ross; Herbert Dubno

[57] ABSTRACT

The method allows surface defect reduction in silica optical-fibres by enriching the external layer by silica bonded carbon atoms within the silica network: SiC.-SiO$_2$. Carbon is obtained from chemical reaction directly during the drawing step.

Volume defects are reduced by rapidly cooling the fibre structure heated up to vitrous transition temperature.

The apparatus allows the method to be carried out during drawing step.

2 Claims, 1 Drawing Figure

U.S. Patent    Oct. 27, 1987    4,702,759
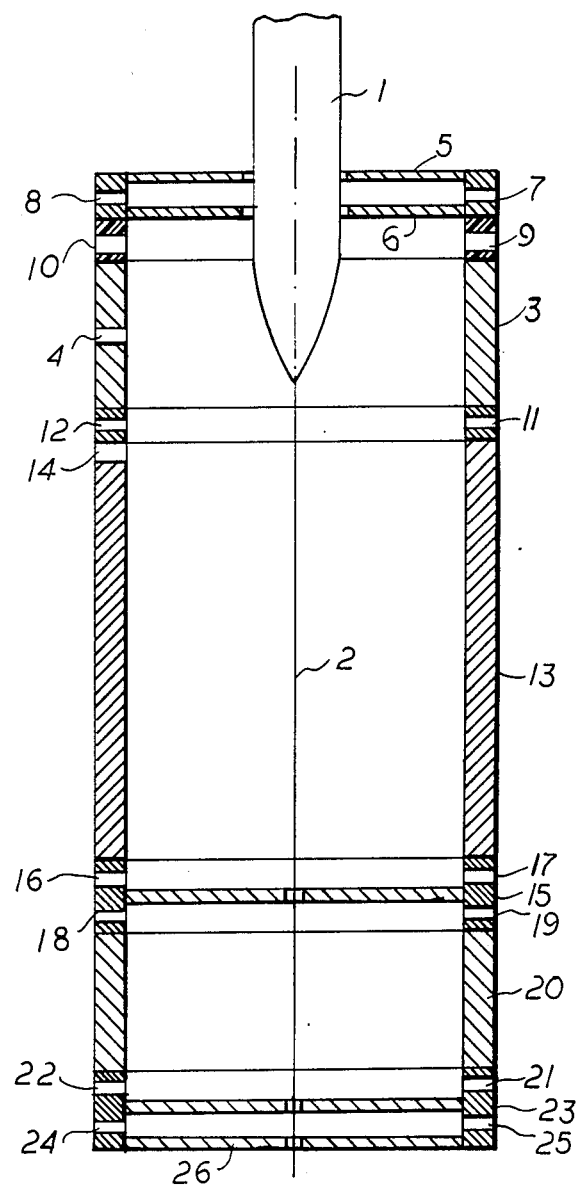

APPARATUS FOR REDUCING VOLUME AND SURFACE DEFECTS IN SILICA OPTICAL-FIBRES

This is a division of application Ser. No. 817,025, filed Jan. 8, 1986, now U.S. Pat. No. 4,659,354, granted Apr. 21, 1987.

DESCRIPTION

The present invention concerns methods of manufacturing transmission media for telecommunications systems using light radiations and more particularly it relates to a method of and an apparatus for reducing surface and volume defects in silica optical-fibres.

As known during drawing both surface and volume defects are generated in the optical fibre.

In the former case the defects consist in superficial micro-fractures of different depth which according to their type and density affect more or less seriously the mechanical properties of resistance to traction and dynamic fatigue of the fibre.

In the later case they consist in network defects such as micro-crystals, bond defects, etc, which entail the formation of colour centres, i.e. zones wherein the optical radiation is absorbed according to a law dependent on the wavelength. They are generally gaussian curves with the maximum in the ultraviolet band. In addition, the volume defects above raise the value of Rayleigh scattering coefficient, and hence the whole attenuation curve. Finally, volume defects increase the network reactivity with polluting agents, such as molecular hydrogen, etc, which can diffuse inside giving rise to new absorption zones.

Not only the optical and geometrical properties of the fibres are to be improved, but also these problems are to be solved.

In Proc. Optical Fibre Communication Washington D.C. March 6-8, 1979, pages 74,75 the paper entitled "Improved fatigue resistance of high-strength optical fibres" by R. Hiskes, describes an attempt at eliminating at least surface defects by directly applying on the fibre, during drawing and prior to coating it with resin, a thin layer of ceramic material.

However surface defects are not completely avoided, as the process cannot take place at high temperature, at which fibre deformations might take place, and hence the adherence between the applied ceramic layer and the fibre is poor. Besides, since the deposition is made directly on the fibre, the drawing speed is slowed down and consequently manufacturing times are lengthened.

These disadvantages are overcome by the method of reducing volume and surface defects in silica optical-fibres, provided by the present invention, by which surface defects of vitreous silica fibres can be avoided by enriching the surface with a compound which changes its thermo-mechanical properties preventing micro-fractures, without perturbations in chemical equilibrium of material. Besides, by small changes to the used apparatus volume defects can be overcome, obtaining a fibre whose vitreous structure better approaches the ideal one.

The present invention provides a method of reducing volume and surface defects in silica optical-fibres, characterized in that during the drawing the surface of transition zone of the preform is chemically activated by reducing atmosphere and a layer of carbon particles under nascent state is deposited, making then the carbon particles diffuse by a temperature equal to glass melting temperature and their reaction with silica take place according to the equation $$Si.[SiO_2] + C \rightarrow SiC.[SiO_2]$$

where the presence of square brackets means a prevailing silica presence in the preform material, and also characterized in that the just-drawn optical fibre is raised to a temperature equal to or slightly higher than the vitreous transition temperature and hence it is rapidly cooled.

The method consists in generating inside the drawing furnace a reducing atmosphere so as to partly activate the surface of the transition zone of the preform, i.e. the zone where the diameter becomes equal to the fibre diameter.

Simultaneously nascent-state carbon particles are deposited on the upper preform zone, thanks to the thermal-gradient presence.

As the preform enters the drawing furnace, the deposited carbon layer meets thermal conditions allowing its weak diffusion inside the material and besides, since the surface is activated by the reducing atmosphere, it can react with the material giving rise to a mixed compound with greater density than silica.

Hence it results less permeable to polluting agents. Carbon as well as hydrogen can be used as reducing agents. Surface activating reactions are as follows:

$$SiO_2.[SiO_2] + 2H_2 \rightarrow Si.[SiO_2] + 2H_2O$$

$$SiO_2.[SiO_2] + 2C \rightarrow Si.[SiO_2] + 2CO$$

where the symbols in square brackets indicate that the material chiefly consists of silica, with a final result of oxygen reduction.

The surface activated in presence of nascent carbon can give rise to a second reaction, which takes always place under silica excess conditions and still at drawing temperature ($\sim 2000°$ C.):

$$Si.[SiO_2] + C \rightarrow SiC.[SiO_2]$$

The result of this second reaction is the partial occupation by carbon atoms of bonds activated by reduction.

The final material has a more compact and uniform structure and presents a more regular surface; as a consequence, its surface properties render it less liable to micro-fractures. Besides, since the whole process is based on diffusive phenomena, the material characteristics vary gradually from the inside towards the outside, thus obtaining a less critical structure from the mechanical point of view.

The fact of operating at high temperatures, about 2000° C., allows the phenomena above and prevents any discontinuity in the material.

To improve material properties from standpoint of volume defects, a rapid-cooling is necessary, i.e. a very high dT/dt (T=temperature; t=time), of the just produced fibre, so as to freeze the molecular state under the conditions of thermal cahos the material has at high temperature, to reproduce the amorphous structure typical of vitreous state. The temperature at which glass formation takes place is the so-named vitreous transition temperature Tg. For an ideal glass, this temperature directly determines also the value of Rayengh scattering coefficient, and hence optical attenuation properties.

Usually the fibre rapidly cools as an effect of its reduced thermal capacity (owing to small dimensions), passing from drawing temperature to ambient temperature. Nevertheless, drawing temperature is gnerally very high, as it corresponds to softening temperature of the material; more precisely it is about twice as high as the vitreous transition temperature, which for pure silica in equal to 1100° C. Operating in this way, the cooled material can keep traces of its condition at too high temperature and hence residual attenuation. Thus the value of Rayleigh scattering coefficient can be higher than the optimal one. The method of the invention provides a passage from softening temperature to ambient temperature through an intermediate step at a temperature slightly higher, for safety purposes, than that of vitreous transition Tg.

The final product, having been frozen under the best conditions for the glass manufacturing, results volume defectless.

The FIGURE shows an apparatus for carrying out the method.

Reference 1 indicates the preform wherefrom optical fibre 2 is drawn. Glass softening temperature, of about 2000° C., is obtained by a furnace 3, equipped with a silica window 4, through which the temperature can be optically read. The preform enters the furnace through a pair of disks 5 and 6, with central holes, between which an inert gas e.g. $N_2$ or Ar, is sent through inlets 7 and 8. The flow of this gas, sucked by inlets 9 and 10 made in the chamber below, separates the high-temperature zone from the zone outside, communicating with one another through gaps present between preform 1 and disks with central holes 5 and 6.

Methane ($CH_4$) is injected through inlets 11 and 12; thanks to high temperature present in furnace 3, it decomposes into $C_2$ and $H_2$.

Nascent state carbon and an atmosphere rich in hydrogen, and consequently with reducing properties, are thus obtained.

$C_2$ and $H_2$ flow impinges onto the preform, where $C_2$ deposits according to normal thermophoretic phenomena and is sucked through inlets 9 and 10.

The just-obtained fibre traverses a second furnace 13, capable of eusuring at its inside a slightly higher temperature than vitreous transition temperature, e.g. 1120° C. Also this furnace is provided with a window 14, through which fibre diameter can be read and is closed at the bottom by a disk 15 with central hole. An inert gas is injected through inlets 16 and 17 inside the furnace 13. Said gas is preheated at 1120° C. and has the task of sealing the gap present between disk 15 and optical fibre 2.

After traversing disk 15, the fibre enters a chamber at low temperature, whose value ranges between +20° and −50° C., delimited by a conditioner 20 and a pair of disks 23 and 26 with central holes. A cold inert gas is injected into the chamber through inlets 18 and 19 and is then sucked away through inlets 22 and 21.

An inert gas is injected also through inlets 24 and 25 with the task of sealing the gap comprised between disk 26 and the fibre.

It is clear that what described has been given by way of non limiting example. Modifications and variations are possible without going out of the scope of the invention.

What is claimed is:

1. An apparatus for drawing silica optical fibers with reduced volume and surface defects, comprising:
   a first furnace for heating an elongated silica-glass optical preform to a glass softening tempeature and including:
   at an upper end thereof two spaced apart disks with aligned central holes through which said preform penetates from a top of the apparatus,
   means for introducing an inert gas between said disks,
   means for drawing gas out of said first furnace at an upper part thereof below said disks, and
   means for introducing a gas at a lower part of the first furnace, the gas introduced at said lower part being selected from the group which consists of a reducing gas and a gas for supplying nascent-state carbon;
   a second furnace below said first furnace and aligned therewith for heating an optical fiber drawn from an end of said preform in said first furnace to a temperature slightly higher than the vitreous transition temperature of the silica glass and including:
   a disk with a central hole at a bottom of said second furnace, the central hole being traversed by said fiber, and:
   means for injecting an inert gas heated to a temperature slightly exceeding said vitreous transition temperature at a lower part of the second furnace; and
   a conditioner below said second furnace and aligned therewith and traversed by said optical fiber for cooling the optical fiber to a temperature of at most ambient temperature, said conditioner being closed at its bottom by two spaced apart disks having aligned central holes traversed by the fiber and being provided with:
   means for injecting an inert gas between the disks of said conditioner, and
   means for introducing a cool inert gas into said conditioner at a lower part thereof above said disks of said conditioner.

2. The apparatus defined in claim 1 wherein said means for introducing a gas at the lower part of said first furnace is a means for introducing methane as a source of nascent carbon.

* * * * *